(12) United States Patent
Mardegan

(10) Patent No.: US 12,146,474 B2
(45) Date of Patent: Nov. 19, 2024

(54) MASS DISPLACEMENT ENERGY STORAGE AND ELECTRICITY GENERATOR

(71) Applicant: Gary Mardegan, St Kilda East (AU)

(72) Inventor: Gary Mardegan, St Kilda East (AU)

( * ) Notice: Subject to any disclaimer, the term of this patent is extended or adjusted under 35 U.S.C. 154(b) by 0 days.

(21) Appl. No.: 18/276,904

(22) PCT Filed: Feb. 17, 2022

(86) PCT No.: PCT/AU2022/050110
§ 371 (c)(1),
(2) Date: Aug. 11, 2023

(87) PCT Pub. No.: WO2022/174292
PCT Pub. Date: Aug. 25, 2022

(65) Prior Publication Data
US 2024/0117793 A1    Apr. 11, 2024

(30) Foreign Application Priority Data
Feb. 19, 2021    (AU) .................................. 2021900441

(51) Int. Cl.
*F03G 3/00*    (2006.01)
*F03G 3/08*    (2006.01)

(52) U.S. Cl.
CPC .............. *F03G 3/094* (2021.08); *F03G 3/08* (2013.01); *F05B 2240/912* (2013.01);
(Continued)

(58) Field of Classification Search
CPC ... F03G 3/094; F03G 3/08; F03G 3/02; F05B 2240/912; F05B 2260/4021;
(Continued)

(56) References Cited

U.S. PATENT DOCUMENTS

| 2020/0024108 A1 | 1/2020 | Pedretti et al. |
| 2020/0025181 A1 | 1/2020 | Pedretti et al. |

(Continued)

FOREIGN PATENT DOCUMENTS

| CN | 211666853 U | 10/2020 |
| DE | 41 35 440 A | 4/1993 |

(Continued)

OTHER PUBLICATIONS

International Search Report and Written Opinion for PCT/AU2022/050110 dated Oct. 5, 2022.

*Primary Examiner* — Joseph Ortega
(74) *Attorney, Agent, or Firm* — Womble Bond Dickinson (US) LLP

(57) ABSTRACT

A mass displacement electricity generator, having a tower and a first mass suspended by the tower for falling and lifting. The first mass is suspended by a pulley arrangement including a first set of pulleys fixed to the tower above the first mass and a second set of pulleys fixed to the first mass. A cable extends through the first and second sets of pulleys and one end of the cable is fixed to one of the tower or to the first mass. A winch includes a barrel about which the cable winds off as the first mass falls and winds on as the first mass lifts. The winch is in driving connection with a flywheel so that as the first mass falls, the cable winds off the barrel and barrel rotation drives the flywheel to rotate. The flywheel is in driving connection with a generator so that rotation of the flywheel drives the generator for generating electrical energy.

20 Claims, 4 Drawing Sheets

(52) U.S. Cl.
CPC . *F05B 2260/4021* (2013.01); *F05B 2260/421* (2013.01); *F05B 2260/504* (2013.01)

(58) Field of Classification Search
CPC .......... F05B 2260/421; F05B 2260/504; F05B 2220/706; H02J 15/007; H02K 7/025; H02K 7/1853; H02K 7/02; H02K 7/06; Y02E 60/16

See application file for complete search history.

(56) References Cited

U.S. PATENT DOCUMENTS

| | | |
|---|---|---|
| 2020/0025182 A1 | 1/2020 | Pedretti et al. |
| 2020/0028379 A1 | 1/2020 | Pedretti et al. |
| 2021/0054830 A1 | 2/2021 | Pedretti et al. |
| 2021/0221652 A1 | 7/2021 | Pedretti et al. |
| 2021/0404445 A1 | 12/2021 | Pedretti et al. |
| 2021/0404447 A1 | 12/2021 | Pedretti et al. |
| 2021/0404448 A1 | 12/2021 | Pedretti et al. |
| 2022/0209537 A1 | 6/2022 | Pedretti et al. |
| 2022/0243701 A1 | 8/2022 | Pedretti et al. |
| 2022/0333577 A1 | 10/2022 | Pedretti et al. |
| 2023/0009666 A1 | 1/2023 | Pedretti |
| 2023/0151799 A1 | 5/2023 | Pedretti et al. |
| 2023/0184229 A1 | 6/2023 | Pedretti |

FOREIGN PATENT DOCUMENTS

| | | | |
|---|---|---|---|
| DE | 4135440 A1 * | 4/1993 | ............... F03G 3/00 |
| DE | 20 2004 011 770 U1 | 11/2004 | |
| DE | 20 2009 001 452 U1 | 5/2009 | |
| GB | 2 549 743 A | 11/2017 | |
| WO | WO 2013/005056 A1 | 1/2013 | |
| WO | WO 2018/134620 A2 | 7/2018 | |
| WO | WO 2020/260596 A1 | 12/2020 | |
| WO | WO 2021/1219888 A1 | 6/2021 | |
| WO | WO 2022/171695 A1 | 8/2022 | |

* cited by examiner

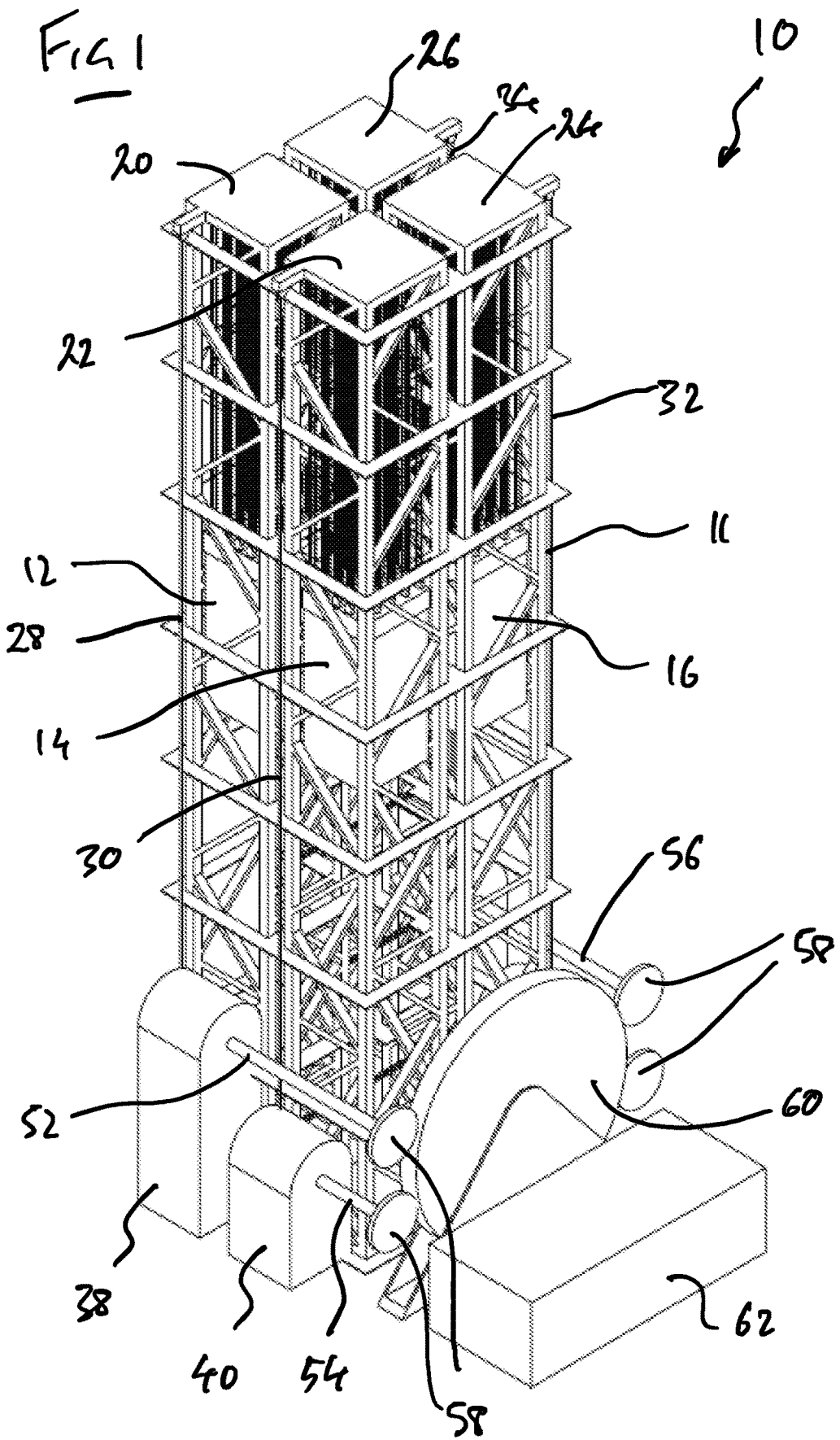

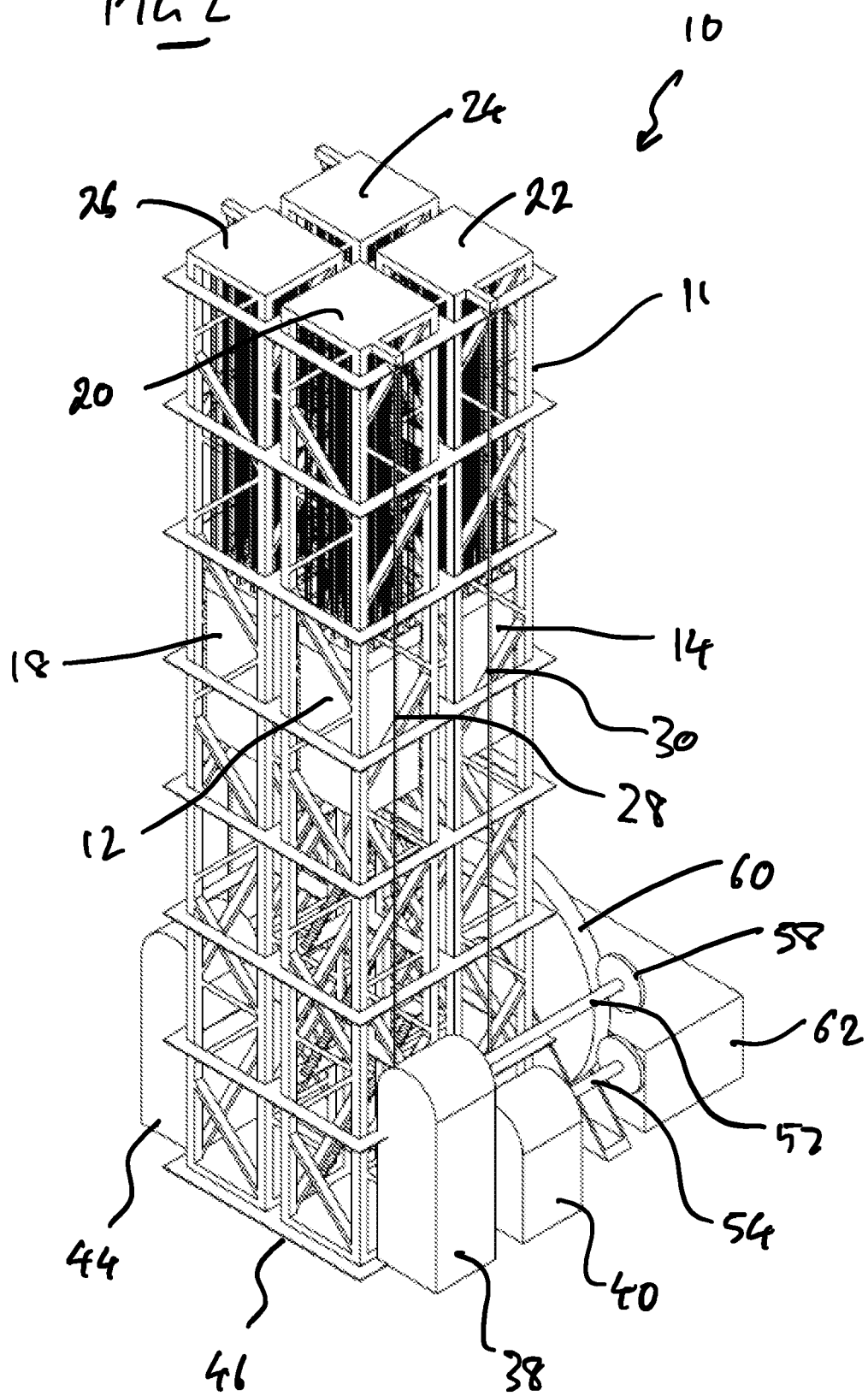

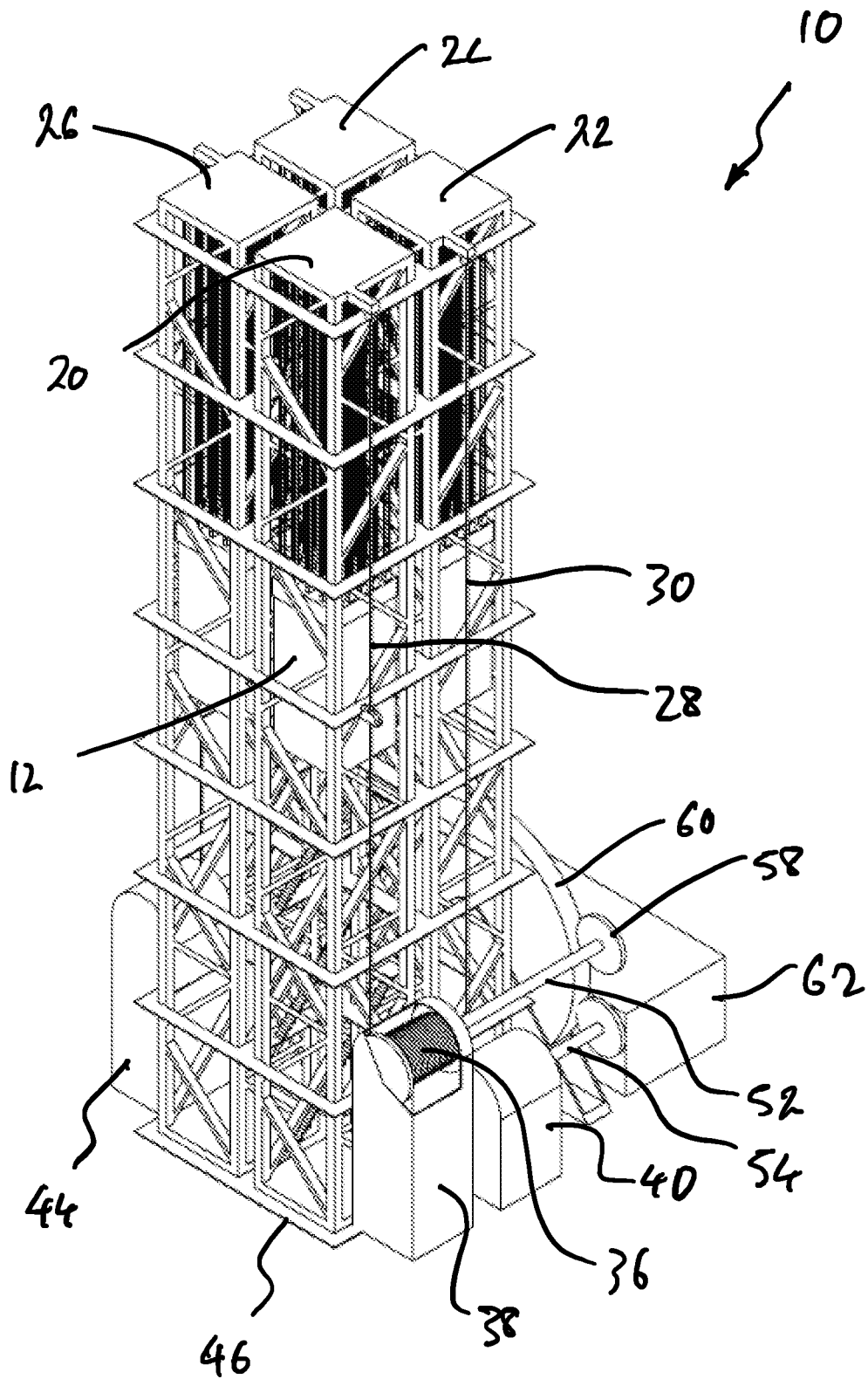

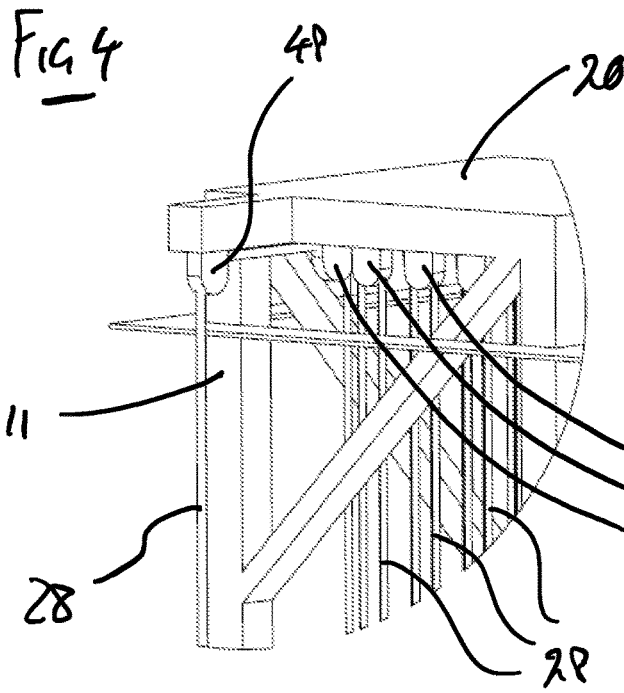
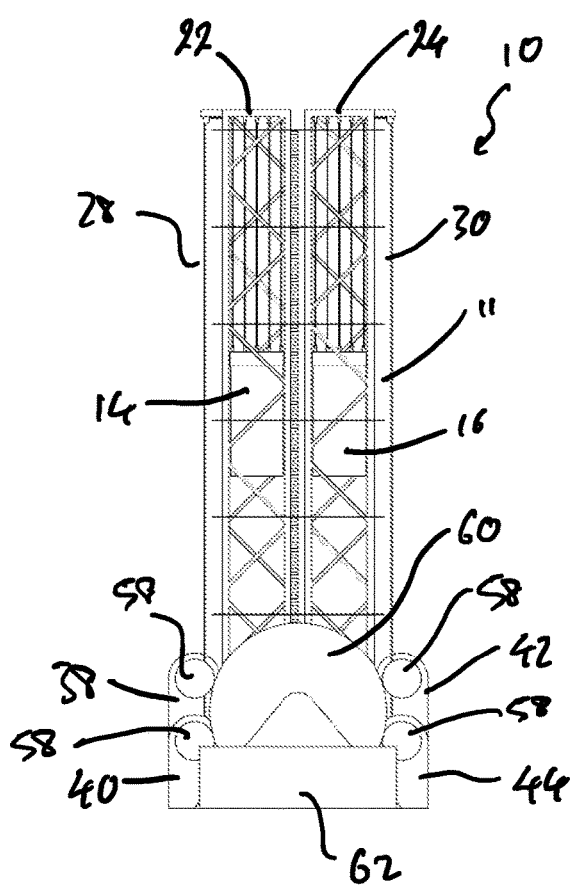
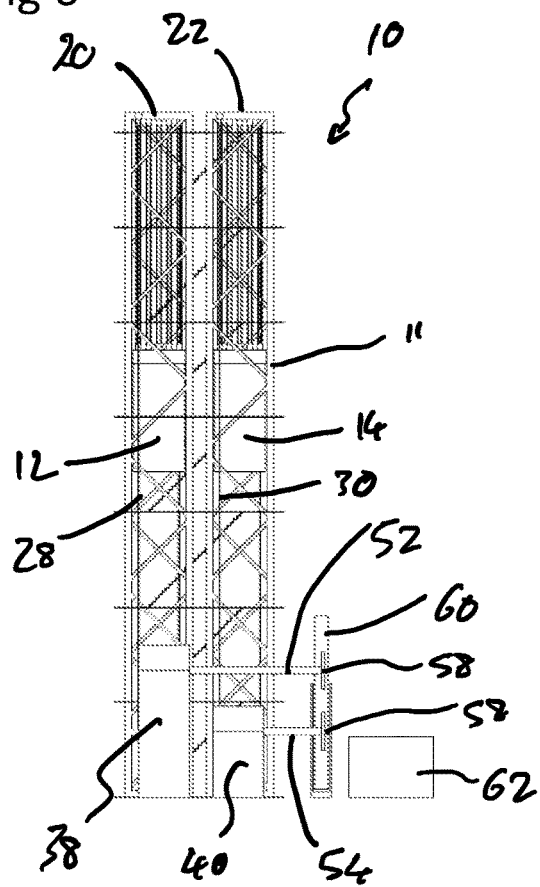

MASS DISPLACEMENT ENERGY STORAGE AND ELECTRICITY GENERATOR

PRIORITY CROSS-REFERENCE

The present application is a national stage application, filed under 35 U.S.C. § 371 of International Patent Application No. PCT/AU2022/050110, filed 17 Feb. 2022, which claims priority from Australian Provisional Patent Application No. 2021900441 filed 19 Feb. 2020, the contents of which are to be considered to be incorporated into this specification by their reference.

TECHNICAL FIELD

The present invention relates to the field of electrical energy generation and energy storage and relates in particular to an apparatus and method for generating electricity by mass displacement.

BACKGROUND OF THE INVENTION

The discussion of the background to the invention that follows is intended to facilitate an understanding of the invention. However, it should be appreciated that the discussion is not an acknowledgement or admission that any aspect of the discussion was part of the common general knowledge as at the priority date of the application.

Electricity can be generated in power stations using coal, gas or nuclear fuels, or in hydro-systems whereby flowing water is harnessed to drive electricity generating turbines, while more recently, solar and wind power has been used in both large scale and small scale generation facilities. Generation by solar power can be by the use of solar photovoltaic (PV) modules or cells, or by concentrating solar rays to a focal point to vaporize a working fluid that can subsequently drive a turbine. Wave power is another form of energy that can be used to generate electricity.

Of the above forms of electricity generation, some are based on fossil fuels (coal and gas) while others are based on renewable fuels (hydro, sun, wind and wave). Nuclear fuel is not normally considered a fossil fuel, but it is a non-renewable fuel and the waste product from the use of nuclear fuel is difficult and dangerous to dispose of.

Mass displacement is another power source that can be used for electricity generation. The use of gravity to lower a weight and to harness the momentum of the falling weight can be used to rotate a turbine or rotor for electricity generation.

Weight mass displacement systems have advantages in electricity generation over some of the existing systems mentioned earlier herein, particularly in relation to environmental emissions benefits compared to coal, gas and nuclear fired power plants. Weight mass displacement systems can also inflict reduced damage to the environment, say compared to hydro electricity generation, or to the aesthetics of the environment such as that which occurs with hydro electricity generation, wind and wave generation.

Further benefits of mass displacement systems are that they are relatively simple and thus reliable to operate. Moreover, they can be relatively compact and sized to suit either large scale operation or small scale operation.

An example of mass displacement electricity generation is shown in international PCT patent application PCT/EP2020/068043 (WO/2020/260596). In this example prior art PCT application, an energy storage system is disclosed whereby a weight is suspended by cables from winches, and when power is required the weight can be lowered under gravity to drive an electrical generating turbine, and when power is not required, the weight can be lifted for later reuse. The advantage of the system appears to be that when excess power in the grid is available the weight can be lifted, whereas when more power than can be supplied in the grid is required, the weight can be allowed to lower under gravity adding more power to the grid.

International application PCT/EP2020/068043 is intended to be operated with the weight being lowered and raised within a ground based shaft. The winches that lower and raise the weight are therefore located at ground level and the weight is lowered and raised in a shaft which extends into the ground below the winches. The shaft can be a vertical shaft which is drilled into the ground. This arrangement is advantageous, because it minimises the aesthetic disturbance made to the area in which the mass displacement generator is located. However, for the system to be effective, the shaft needs to be drilled to a depth of some 20 to 30 meters and this requires significant effort initially to drill the shaft and to maintain the shaft against normal ground movement that can displace the axis of the shaft and thus interfere with the travel of the weight within the shaft.

The present invention is directed to a mass displacement electrical generator in the same field as PCT application PCT/EP2020/068043, but which is intended to offer a different solution to electricity generation than that provided by PCT/EP2020/068043.

SUMMARY OF THE INVENTION

According to the present invention there is provided a mass displacement electricity generator, comprising
a. a tower,
b. a mass suspended by the tower for falling and lifting, the mass being suspended by a pulley arrangement comprising a first set of pulleys fixed to the tower above the mass and a second set of pulleys fixed to the mass, and a cable extending through the first and second sets of pulleys and one end of the cable being fixed to one of the tower or the mass,
c. a winch including a barrel about which the cable winds off as the mass falls and winds on as the mass lifts,
d. the winch being in driving connection with a flywheel so that as the mass falls, the cable winds off the barrel and barrel rotation drives the flywheel to rotate, and
e. the flywheel being in driving connection with a generator so that rotation of the flywheel drives the generator for generating electrical energy.

The present invention also provides a system of generating electricity, comprising,
a. suspending a first mass in a tower by a pulley arrangement comprising a first set of pulleys fixed to the tower above the first mass and a second set of pulleys fixed to the first mass, extending a cable through the first and second sets of pulleys and fixing one end of the cable to one of the tower or to the first mass,
b. extending a free end of the cable to a winch that includes a barrel about which the cable winds off as the first mass falls and winds on as the first mass lifts,
c. connecting the winch with a flywheel for driving the flywheel so that as the first mass falls, the cable winds off the barrel and barrel rotation drives the flywheel to rotate, and
d. connecting the flywheel with a generator so that rotation of the flywheel drives the generator for generating electrical energy.

A mass displacement electricity generator according to the present invention utilises a falling mass to generate electricity, by driving a flywheel that drives a generator. Moreover, the mass falls by the cable extending through the first and second sets of pulleys which act as gearing so that by altering the number of pulleys that the cable extends through, the mass can fall faster or slower, thereby increasing or decreasing the speed of rotation of the flywheel and thus increasing or decreasing the amount of electricity generated. The flywheel forms an important component of the mass displacement electricity generator of the invention as it facilitates constant delivery of rotational energy to the generator for consistent energy generation. The adoption of a flywheel in the manner contemplated by the present invention is not known to the applicant to be part of the prior art.

The output of the electricity generator according to the present invention can be varied by increasing or decreasing the weight of the mass, by increasing or decreasing the number of pulleys of the first and second sets of pulleys, or by changing the gearing connection between the winch and the flywheel and/or between the flywheel and the generator. For example, slowing the fall of the mass extends the time of electricity generation but reduces the electrical output. Slowing or increasing the rate at which the mass falls can be achieved by any of the variations mentioned above.

The rate at which the mass falls can be slowed but without a reduction in the electrical output by increasing the weight of the mass.

The output of the electricity generator according to the present invention can be varied by the addition of a second mass that is suspended by the tower by a second pulley arrangement comprising a first set of pulleys fixed to the tower above the second mass and a second set of pulleys fixed to the second mass and a cable extending through the first and second sets of pulleys and one end of the cable being fixed to one of the tower or the mass. The cable can extend to a second winch in the same manner as with the first mass and the winch can connect to the same flywheel as the first mass, or can connect to a second flywheel. The second flywheel can drive a second generator.

The second mass can be supported in the same tower as the first mass and in some arrangements of the invention, the second mass has the same vertical travel or drop as the first mass so that the second mass is operable to generate the same energy for electrical generation as the first mass. The second mass can simply replicate the first mass to double the capacity of the electricity generator according to the present invention.

Third and fourth masses can be added to the electricity generator and can operate according to the second mass as described above. In fact, any number of masses can be provided as required for the desired electrical generating capacity of the generator.

Each mass of the electricity generator can be used in falling mode to drive a single flywheel, or different flywheels. A single flywheel is preferred as it allows the capacity of the one system to be varied by the number of falling masses feeding energy into the system. Termination of falling movement of a mass can be by controlling rotation of the barrel about which the cable associated with the mass winds onto. By braking barrel rotation, or by terminating barrel rotation, the input to the electricity generator is reduced or terminated.

The electricity generator according to the present invention can operate with a single flywheel, or two or more flywheels can be included. These flywheels can be arranged to connect one after the other so that a first flywheel could be connected to the winch during initial commencement of electricity generation when the mass is commencing falling movement and when the mass reaches a predetermined fall velocity, the second flywheel could be connected to slow or reduce the fall velocity. A clutch arrangement can be employed to control the connection and disconnection of the second and additional flywheels.

The cable that extends through the first and second sets of pulleys and attaches to the tower or the first mass can also extend through the first and second sets of pulleys associated with a second mass, and additional masses as provided. This links the masses and they can be arranged to fall together. In this arrangement, the cable would extend through the first and second sets of pulleys of the first and second masses and, if provided, additional masses, and would have one end attached to the tower or to one of the first or second or additional masses and the cable would extend to the winch.

The cable that extends through the first and second sets of pulleys is required to be of significant length. It is envisaged that each set of pulleys could have 120 pulleys, or 240, or 360 or 480 pulleys. Moreover, the fall distance of the mass or masses could be about 21 m, or 19 m, or 16 m or 14 m. These different arrangements will require a cable length of at least about 2600 m or 4500 m, or 5800 m or 6500 m. The length of the cable is required to be sufficient to extend from the barrel of a winch up to the first set of pulleys fixed to the tower above the mass and then through each of the pulleys of the first and second sets of pulleys. It is to be noted that when the mass has fallen to the lowest point, the distance between the first and second sets of pulleys will be at a maximum and the cable will be required to extend that maximum distance the same number of times as the number of pulleys in the first and second sets of pulleys. Thus, if each set of pulleys has 120 pulleys, then the cable will rise and fall 120 times to connect between the pulleys of the first and second sets of pulleys. There will thus be 120 strands of cable extending between the first and second sets of pulleys and if for example, the fall distance of the mass is about 21 m, then the length of cable needs to be greater than 120 m×21=2520 m. The cable length will be greater than this because the cable needs to extend about the pulleys and the cable needs to extend to the winch.

The fall distance of the mass or masses can be the height of the tower minus the height of the mass or masses. A 25 m tower combined with a 2.6 m height mass can allow a 21.4 m fall or drop. Further examples will be given following the discussion of drawings that follows.

The electricity generator according to the present invention is intended to provide reliable electricity generation over a period of hours. Initial calculations suggest a tower of approximately 12 storeys or approximately 37 m height can be used with concrete mass blocks having dimensions of 12 m×7.5 m×10 m and a weight of about 2200 t. The barrel of the winch can have a diameter of about 2.4 m and an axial length of about 20 m. The cable can have a length of about 12 km. In such an arrangement, the mass block can fall at a velocity of about 2 mm/s over about 3 hours.

In the above arrangement, the flywheel can have a weight of about 800 ton and a diameter of about 20 m×2.4 wide.

Once the or each mass has fallen the maximum distance, then the flywheel will slow as the driving input is gone. In some forms of the invention, as soon as one mass has fallen the maximum distance, another mass can commence falling, or more likely, there can be an overlap in the commencement of the new mass falling prior to the first mass reaching the bottom of its fall.

The fall of the mass can be pulsed so that the mass falls more slowly but without interrupting the generation of electricity by the continuous rotation of the flywheel. If the pulsing is sufficiently short then rotation of the flywheel will not be interrupted. Pulsing of the mass can be achieved in any suitable manner and in some forms of the invention, a generator might be attached directly to the barrel of the winch or in the driving connection between the winch and the flywheel to apply a brake to the travel of the mass. The generator can be switched between connection and disconnection with the barrel or the driving connection, such as by a clutch arrangement. The connection time might be for between 3 and 5 seconds for example and then disconnected for a similar period. The generator can brake travel of the mass to either slow it or to completely stop it. The generator can be the generator that is in driving connection with the flywheel, or it can be a second or additional generator to the generator that is in driving connection with the flywheel.

A mass displacement electricity generator according to the present invention can include multiple winches. For example, the electricity generator according to the present invention can include two mass weights and a cable can extend from each mass weight to a separate winch. The pair of winches can drive a single flywheel, or a pair of flywheels. In arrangement according to the present invention, four mass weights are provided and a cable extends from each mass weight to a separate winch, so that four winches are provided. The four winches can drive a single flywheel, or a pair of flywheels, or four flywheels for example.

The mass displacement electricity generator according to the present invention can conveniently be constructed in a compact arrangement, or have a compact footprint, albeit that the installation of the electricity generator is large. However, the footprint can be relatively small given that the installation mainly requires height. The installation can thus advantageously be made in residential areas without requiring significant land area and can be suitable for built-up areas of medium or high rise residential or commercial buildings.

Alternatively, the mass displacement electricity generator according to the present invention can be installed for use in rural settings, or in mining sites for example, whereby it will add to the mix of available energy sources.

BRIEF DESCRIPTION OF THE DRAWINGS

In order that the invention may be more fully understood, some embodiments will now be described with reference to the figures in which:

FIG. 1 is a perspective view of a mass displacement electricity generator according to one embodiment of the present invention.

FIG. 2 is a perspective view from the opposite side of the mass displacement electricity generator of FIG. 1.

FIG. 3 is a same view of the mass displacement electricity generator of FIG. 2, but with a section of the housing of one winch shown cut-away to show the barrel of the winch.

FIG. 4 is a detailed view of an upper section of the mass displacement electricity generator of FIG. 1.

FIG. 5 is a front view of the mass displacement electricity generator of FIG. 1.

FIG. 6 is a side view of the mass displacement electricity generator of FIG. 1.

DETAILED DESCRIPTION

FIG. 1 illustrates a mass displacement electricity generator 10 according to one embodiment of the present invention.

The electricity generator 10 includes a tower 11 and first to fourth masses 12, 14, 16 and 18 suspended within the tower 11. It can be seen from FIG. 1 and from FIGS. 2 and 3, that the masses 12 to 18 are each square in cross-section and rectangular in length and the tower 10 supports them side by side or adjacent one another.

The masses 12 to 18 are each suspended within the tower 11 by a pulley arrangement that comprises a first set of pulleys fixed to the inside of the upper tower plates 20, 22, 24 and 26 and to a second set of pulleys fixed to the upper facing surface of the masses 12 to 18. Cables 28, 30, 32 and 34 extend through the first and second sets of pulleys, with one end of each cable being fixed to one of the tower or the mass, and the other end extending downwardly and about a barrel 36 (see FIG. 3) only one of which is shown in FIG. 3 but which form part of each of the separate winches 38, 40, 42 and 44.

As shown in FIG. 3, the cable 28 winds onto and off the barrel 36 of the winch 38 depending on the direction of travel of the mass 12 up or down. In the figures, the mass 12 and the other masses 14 to 18 are all shown at about one third of their vertical travel between the plates 20 to 26 of the tower 11 and the base 46 from which the tower 11 extends. In some forms of the invention, the masses 12 to 18 each fall at a velocity of about 2 mm/s over about 3 hours. Examples that follow show how this can be done. The masses 12 to 18 can all fall together at the same rate, or at different rates, or less than all of the masses 12 to 18 can fall while the remaining masses remain stationary or one or more of the masses are lifted from a lower position. The stationary masses can commence falling once others of the masses have reached the lowest level they can fall to for example.

The cables 28 to 34 extend upwardly from the barrels within the associated winches 38 to 44 and extend 90 degrees through an upper pulley 48 as shown in FIG. 4. FIG. 4 shows the upper end of the cable 28 that extends from the barrel 36 and shows that it extends through the upper pulley 48. The cable 28 extends from the pulley 48 into the first set of pulleys 50 that are attached to the inside of the upper tower plate 20. The cable 28 extends through a first pulley in the first set of pulleys 50 and then downwardly to a pulley of the second set of pulleys (not shown) that is attached to the upper surface of the mass 12. The cable 28 then returns upwardly to another pulley of the first set of pulleys 50 and then downwardly to a pulley of the second set of pulleys. The cable 28 thus threads through each pulley in the first and second sets of pulleys until it has passed through each of those pulleys and then it can be fixed to one of the tower 11 or to the mass 12. In some forms of the invention, there are about 480 pulleys (24 pulleys per column×20 rows) in each of the first and second sets of pulleys, however, there can be a greater or lesser number.

The cable 28 is thus required to be of significant length. For example, if the mass 12 can fall a distance of about 26 m, then the length of cable needs to include a section of about 26×480=12,480 m just to span between the first and second sets of pulleys. At a fall rate of 1.0 m/s, the time taken for the mass 12 to fall will be about 208 min. However, the cable also needs to extend about the pulley wheels and from the barrel up to the first set of pulleys. So the length of the cable 28 will be longer than 12,480 m. Where the height of the tower allows a greater fall distance, or where the number of pulleys is increased, the length of the cable will be greater.

The manner in which pulleys operate to lift and lower weights is well known. For the present invention, increasing the number of pulleys in each of the first and second sets of pulleys means that the mass 12 will fall more slowly than if there is a reduced number of pulleys in each of the first and second sets of pulleys. Thus, one way of varying the speed at which the mass 12 falls from adjacent the plate 20 of the tower 11 to the base 46, is to increase the number of pulleys in each of the first and second sets of pulleys.

FIG. 4 only illustrates pulleys of the first set of pulleys 50, but it should be appreciated that a similar pulley arrangement is attached to the upper surface of the mass 12 for the cable 28 to extend or thread through.

As indicated earlier, as the masses 12 to 18 fall, the respective cables 28 to 34 wind off the barrels 36 within the respective winches 38 to 44. Each of the barrels connects to a shaft, with shafts 52, 54 and 56 visible in the figures. The shaft that is associated with the winch 44 (see FIG. 5) is not visible in the figures.

Each of the shafts 52 to 56 extends to a drive wheel 58 that connects with a flywheel 60, that is in turn connected to a generator, so that rotation of the flywheel 60 under drive by the drive wheels 58 rotates a rotor within the generator 62 to generate electricity. The actual engagement of the drive wheels 58 with the flywheel 60 can be by tooth engagement rather than the frictional engagement shown in the figures. Of course other arrangements can be adopted for transferring drive between the drive wheels 58 and the flywheel 60, such as by a different form of geared connection, or by belt or chain drive. Because the present invention contemplates that one or more of the masses 12 to 18 can fall independently of the other masses, it is to be appreciated that a single drive wheel 58 can drive the flywheel 60 to rotate, but at a lower speed than if two or more of the drive wheels 58 were driving the flywheel 60.

Moreover, the electricity generator 10 can be modified to include a pair of flywheels, or four flywheels for example. If a pair of flywheels were provided, then two of the drive wheels 58, such as extending from the winches 38 and 40, could drive the first flywheel and the drive wheels 58 extending from the winches 42 and 44 could drive the second flywheel.

Moreover, the actual engagement of the flywheel 60 with the generator 62 can be of any suitable form and for example, the flywheel 60 can drive a shaft to rotate and that shaft can be in geared connection with a shaft of the generator 62 for driving the generator. Shaft connection between the flywheel 60 and the generator 62 is not shown in the figures, but would be easily conceived by a person skilled in the art.

The generator 62 may be the only point of generation in the mass displacement electricity generator 10, or additional generators might be provided. A generator might be attached directly to the barrel 36 of the winches 38 to 44, or in the driving connection between the winches 38 to 44 and the flywheel 60 to apply a brake to the travel of the masses 12 to 18. These generators might provide reduced power when the power requirements are low, and might allow power to be generated by one, two or three of the masses 12 to 18, instead of driving the generator 62 by all four of the masses 12 to 18.

As discussed earlier herein, these additional generators could be employed to pulse the fall of the masses 12 to 18 to brake travel of the masses 12 to 18, to either slow them or to completely stop them. This allows the masses 12 to 18 to fall more slowly but without interrupting the generation of electricity by the continuous rotation of the flywheel if the flywheel is still being driven. If the pulsing is sufficiently short then rotation of the flywheel will not be interrupted.

The masses 12 to 18 can be lifted in times of off-peak electricity usage, or when there is excess electricity in the grid. This might be in times of peak solar generation during the day so that the masses 12 to 18 can be lifted ready for the electricity generator 10 to be used at night, or during high wind events that occur at any time during the day or night. The electricity generator 10 can be used in concert with wind generation when generation falls due to light or stagnant wind conditions, or during overcast days when sunlight is weak, or at night when sunlight is not available.

The electricity generator 10 thus can work in concert with other forms of electricity generation to supply a consistent base load, or to add to the base load when required or when the other form or forms of electricity generation are depleted. Alternatively, the electricity generator 10 can be the primary form of electricity generation as long as a source of electricity is available for lifting the masses 12 to 18 when required. The electricity generator 10 can also be used to recharge batteries in a battery storage facility.

The electricity generator 10 is relatively simple in construction and thus is expected to provide robust and reliable performance over time. The environmental advantages of the electricity generator 10 are also advantageous in the absence of the use of fossil fuels. This is a particular advantage where the masses 12 to 18 can be lifted with the use of solar, hydro, wind or wave generated electricity.

EXAMPLES

The following examples show how the number of pulleys in the first and second sets of pulleys affects the time taken for a mass to travel the available fall distance from the top of the tower to the base. The examples show generator constructions that use towers having different fall distances, masses having different mass weight and cables of different lengths.

The examples all use a mass fall rate of 1.0 m/s. This fall rate is determined by frictional resistance within the system and by generator resistance. Different fall rates can be selected and will alter mass fall time.

Example 1

Based on an available fall distance of 21.4 m and with the number of pulleys being 120 in each of the first and second sets of pulleys, then the total length of the cable extending through the first and second sets of pulleys will be about 21.4×120=2568 m. If the fall rate is set at 1.0 m/s, then the time taken for the masses to fall will be 42.8 min.

Example 2

Based on an available fall distance of 18.8 m and with the number of pulleys being 240 in each of the first and second sets of pulleys, then the total length of the cable extending through the first and second sets of pulleys will be about 18.8×240=4512 m. If the fall rate is set at 1.0 m/s, then the time taken for the masses to fall will be 75.2 min.

Example 3

Based on an available fall distance of 16.2 m and with the number of pulleys being 360 in each of the first and second sets of pulleys, then the total length of the cable extending through the first and second sets of pulleys will be about 16.2×360=5832 m. If the fall rate is set at 1.0 m/s, then the time taken for the masses to fall will be 97.2 min.

Example 4

Based on an available fall distance of 13.6 m and with the number of pulleys being 480 in each of the first and second sets of pulleys, then the total length of the cable extending through the first and second sets of pulleys will be about 13.6×480=6528 m. If the fall rate is set at 1.0 m/s, then the time taken for the masses to fall will be 108.8 min.

The masses can vary in weight and examples include 550 t, 1100 t, 1650 t and 2200 t. As the number of pulleys increases, it is preferable to increase the weight of the mass or masses to overcome increased frictional resistance.

If the above examples were to be applied to taller towers, then the fall time for the masses would increase. Thus, if a tower was employed that provides a greater fall distance, the following changes to the fall time given in the examples above would apply.

Example 5

Based on an available fall distance of 33.4 m and with the number of pulleys being 120 in each of the first and second sets of pulleys, then the total length of the cable extending through the first and second sets of pulleys will be about 33.4 m×120=4008 m. At a fall rate of 1.0 m/s, the time taken for the masses to fall will be 66 min 48 sec.

Example 6

Based on an available fall distance of 30.8 m and with the number of pulleys being 240 in each of the first and second sets of pulleys, then the total length of the cable extending through the first and second sets of pulleys will be about 30.8 m×240=7392 m. At a fall rate of 1.0 m/s, the time taken for the masses to fall will be 123 min 12 sec.

Example 7

Based on an available fall distance of 28.2 m and with the number of pulleys being 360 in each of the first and second sets of pulleys, then the total length of the cable extending through the first and second sets of pulleys will be about 28.2×360=10152 m. At a fall rate of 1.0 m/s, the time taken for the masses to fall will be 169 min 12 sec.

Example 8

Based on an available fall distance of 25.6 m and with the number of pulleys being 480 in each of the first and second sets of pulleys, then the total length of the cable extending through the first and second sets of pulleys will be about 25.6 m×480=12288 m. At a fall rate of 1.0 m/s, the time taken for the masses to fall will be 204 min 48 sec.

For a mass displacement electricity generator that has four masses, in Example 8, the fall time is 4×204.8 mins=819.2 mins=13.65 hrs.

These examples show that the mass displacement electricity generator according to the invention can produce a constant rate of electricity generation over an extended period of time and thus can provide a reliable alternative or additional form of electricity generation that can be largely renewable if the masses are lifted during periods of alternative excess electricity generation through solar, wind or other renewable forms of electricity generation.

Advantageously, the mass displacement electricity generators according to the invention harness the energy of the falling masses through the transmission train comprising the winch, the flywheel and the generator. The generator converts the rotational energy of the flywheel into electricity for direct use or for addition to the electricity grid, or for battery storage. The interposition of the flywheel is of importance to the invention to maintain constant delivery of rotational energy to the generator. The adoption of a flywheel in the manner contemplated by the present invention is not known to the applicant to be part of the prior art.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A mass displacement electricity generator, comprising a tower,
a first mass suspended by the tower for falling and lifting, the first mass being suspended by a pulley arrangement comprising a first set of pulleys fixed to the tower above the first mass and a second set of pulleys fixed to the first mass, and a cable extending through the first and second sets of pulleys and one end of the cable being fixed to one of the tower or to the first mass,
a winch including a barrel about which the cable winds off as the first mass falls and winds on as the first mass lifts, the winch being in driving connection with a flywheel so that as the first mass falls, the cable winds off the barrel and the barrel rotation drives the flywheel to rotate, and
the flywheel being in driving connection with a generator so that rotation of the flywheel drives the generator for generating electrical energy.

2. The mass displacement electricity generator according to claim 1, including a second mass that is suspended by the tower by a second pulley arrangement comprising a first set of pulleys fixed to the tower above the second mass and a second set of pulleys fixed to the second mass and a second cable extending through the first and second sets of pulleys and one end of the second cable being fixed to one of the tower or to the second mass, the second cable extending to a second winch which includes a barrel about which the second cable winds off as the second mass falls and winds on as the second mass lifts, the second winch being in driving connection with the flywheel so that as the second mass falls, the second cable winds off the barrel and barrel rotation drives the flywheel to rotate.

3. The mass displacement electricity generator according to claim 2, the second mass being supported in the same tower as the first mass.

4. The mass displacement electricity generator according to claim 2, the second mass being supported in a second tower.

5. A mass displacement electricity generator according to claim 2, the second mass having the same vertical travel as the first mass.

6. The mass displacement electricity generator according to claim 1, including a second mass that is suspended by the tower by a second pulley arrangement comprising a first set of pulleys fixed to the tower above the second mass and a second set of pulleys fixed to the second mass and a second cable extending through the first and second sets of pulleys and one end of the second cable being fixed to one of the tower or the second mass, the second cable extending to a second winch which includes a barrel about which the second cable winds off as the second mass falls and winds on as the second mass lifts, the second winch being in driving connection with a second flywheel so that as the second mass falls, the second cable winds off the barrel and barrel rotation drives the second flywheel to rotate, the second flywheel being in driving connection with a generator so that rotation of the second flywheel drives the generator for generating electrical energy.

7. The mass displacement electricity generator according to claim 6, the second flywheel driving a second generator.

8. The mass displacement electricity generator according to claim 1, including one or more further masses that are suspended by the tower by one or more further pulley arrangements each comprising a first set of pulleys fixed to the tower above the one or more further masses and a second set of pulleys fixed to the one or more further masses and a respective cable extending through the first and second sets of pulleys and one end of the cable being fixed to one of the tower or to the one or more further masses, the respective cables extending to a respective winch which includes a barrel about which the one or more further cables winds off as the one or more further masses fall and winds on as the one or more further masses lifts, the winch being in driving connection with the flywheel so that as the one or more further masses fall, the cable winds off the barrel and barrel rotation drives the flywheel to rotate.

9. The mass displacement electricity generator according to claim 1, including first and second flywheels, the first flywheel connecting to the winch during initial commencement of electricity generation when the first mass is commencing falling movement and when the first mass reaches a predetermined fall velocity, the second flywheel connecting to the winch to slow or reduce the fall velocity of the first mass.

10. The mass displacement electricity generator according to claim 1, the winch being drivable to wind on the cable associated with the winch to lift the mass associated with the winch.

11. The mass displacement electricity generator according to claim 1, the tower having a height of approximately 12 storeys or approximately 37 m.

12. The mass displacement electricity generator according to claim 1, the first mass having dimensions of about 12 m×7.5 m×10 m and a weight of about 2200 t.

13. The mass displacement electricity generator according to claim 1, the first mass being arranged to fall at a velocity of about 1 m/s over about 3 hours.

14. A system of generating electricity, comprising,
suspending a first mass in a tower by a pulley arrangement comprising a first set of pulleys fixed to the tower above the first mass and a second set of pulleys fixed to the first mass, extending a cable through the first and second sets of pulleys and fixing one end of the cable to one of the tower or to the first mass,
extending a free end of the cable to a winch that includes a barrel about which the cable winds off as the first mass falls and winds on as the first mass lifts,
connecting the winch with a flywheel for driving the flywheel so that as the first mass falls, the cable winds off the barrel and the barrel rotation drives the flywheel to rotate, and
connecting the flywheel with a generator so that rotation of the flywheel drives the generator for generating electrical energy.

15. The system of generating electricity according to claim 14, comprising varying the output of the electricity generated by increasing or decreasing the weight of the mass, by increasing or decreasing the number of pulleys of the first and second sets of pulleys, or by changing the gearing connection between the winch and the flywheel or between the flywheel and the generator.

16. The system of generating electricity according to claim 14, termination of falling movement of the first mass being controlled by controlling rotation of the barrel about which the cable associated with the first mass winds onto.

17. The system of generating electricity according to claim 14, including allowing the first mass to fall the maximum distance and then allowing a second mass to commence falling.

18. The system of generating electricity according to claim 14, including allowing the first mass to fall a predetermined distance and before the first mass has fallen the maximum distance, allowing a second mass to commence falling.

19. The system of generating electricity according to claim 14, comprising the mass being pulsed during fall.

20. The system of generating electricity according to claim 19, the mass being pulsed by connecting a generator directly to the barrel of the winch or in the driving connection between the winch and the flywheel to apply a brake to the travel of the mass.

* * * * *